United States Patent
Jiang et al.

(10) Patent No.: US 12,546,303 B2
(45) Date of Patent: Feb. 10, 2026

(54) AIR QUALITY SENSING MODULE IN HANDHELD DEVICE AND AIR PUMP

(71) Applicant: xMEMS Labs, Inc., Santa Clara, CA (US)

(72) Inventors: Jengyaw Jiang, Saratoga, CA (US); Jye Ren, Taipei (TW); Eldwin Jiaqiang Ng, Sunnyvale, CA (US); Jemm Yue Liang, Sunnyvale, CA (US); Martin George Lim, Hillsborough, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/988,923

(22) Filed: Dec. 20, 2024

(65) Prior Publication Data

US 2025/0223957 A1    Jul. 10, 2025

Related U.S. Application Data

(60) Provisional application No. 63/618,391, filed on Jan. 8, 2024.

(51) Int. Cl.
*F04B 43/04* (2006.01)
*F04B 45/04* (2006.01)
*G01N 33/00* (2006.01)

(52) U.S. Cl.
CPC .......... *F04B 43/043* (2013.01); *F04B 45/043* (2013.01); *G01N 33/0009* (2013.01)

(58) Field of Classification Search
CPC .... F04B 43/043; F04B 43/046; F04B 43/025; F04B 45/043
See application file for complete search history.

(56) References Cited

U.S. PATENT DOCUMENTS

| | | | |
|---|---|---|---|
| 10,935,529 B2 | 3/2021 | Mou | |
| 11,743,659 B2 | 8/2023 | Liang | |
| 11,835,041 B2* | 12/2023 | Seidl | F04B 53/1047 |
| 11,898,549 B2* | 2/2024 | Mohr | F04B 43/02 |
| 11,955,168 B2* | 4/2024 | Wang | G11C 13/003 |
| 11,957,060 B2* | 4/2024 | Ullakko | F04B 43/043 |
| 2003/0059317 A1 | 3/2003 | Keilman | |
| 2005/0129541 A1 | 6/2005 | Tsai | |
| 2020/0088185 A1 | 3/2020 | Mou | |

FOREIGN PATENT DOCUMENTS

| | | | |
|---|---|---|---|
| CN | 101226166 B | 8/2013 | |
| CN | 103470481 A | 12/2013 | |
| CN | 114047302 A | 2/2022 | |
| CN | 118566427 A * | 8/2024 | |
| KR | 10-2022-0103043 A | 7/2022 | |
| KR | 10-2023-0165894 A | 12/2023 | |
| TW | 200951975 | 12/2009 | |
| TW | M552163 U | 11/2017 | |
| WO | 2019/075161 A1 | 4/2019 | |
| WO | WO-2022180185 A1 * | 9/2022 | F24F 11/32 |

* cited by examiner

*Primary Examiner* — Charles G Freay
(74) *Attorney, Agent, or Firm* — Winston Hsu

(57) ABSTRACT

An air quality sensing module includes a chamber, an air quality sensor and an air pump. The air quality sensing module is disposed or to be disposed within a handheld device. The air pump produces an airflow toward or away from the chamber, for the air quality sensor to perform an air quality sensing operation. A direction of the airflow produced by the air pump within the handheld device is reversible.

20 Claims, 11 Drawing Sheets

AIR QUALITY SENSING MODULE IN HANDHELD DEVICE AND AIR PUMP

CROSS REFERENCE TO RELATED APPLICATIONS

This application claims the benefit of U.S. Provisional Application No. 63/618,391, filed on Jan. 8, 2024. The content of the application is incorporated herein by reference.

BACKGROUND OF THE INVENTION

1. Field of the Invention

The present invention relates to an air quality sensing module and an air pump, and more particularly, to an air quality sensing module and an air pump in a handheld device.

2. Description of the Prior Art

Air quality, often taken for granted, plays a critical role in our health and well-being. The air people breathe is a complex mixture of gases and particulate matter, and the presence of pollutants can have significant short and long-term health consequences.

Poor air quality is linked to a range of respiratory and cardiovascular problems, including asthma, bronchitis, lung cancer, heart attacks, and strokes. Harmful pollutants such as particulate matter (PM2.5 and PM10), ozone ($O_3$), nitrogen dioxide ($NO_2$), and sulfur dioxide ($SO_2$) can irritate the airways, reduce lung function, and trigger inflammation. Vulnerable populations, such as children, the elderly, and those with pre-existing health conditions, are particularly susceptible to the adverse effects of air pollution.

Hence, air quality sensor is therefore essential for such group of people.

Unfortunately, current air quality sensors are often bulky and inconvenient for personal use. This limits their ability to provide real-time, close-proximity, or even breathing-zone air quality data which are crucial for individual health decisions.

For example, current gas/dust/particle sensing units are often implemented in air purifier or vacuum cleaner, where sufficient air flow is driven by fan. The fan module, no matter it has blades or bladeless, needs a rotor to drive it. The size and noise make it difficult to implement the gas/particle sensor in close-proximity use.

The CO (carbon monoxide) sensor, on the other hand, needs air diffusion and enough concentration to have enough accuracy and acceptable response. Normally, it would take more than 30 seconds to measure the air and get the data once. Such slow response is not good enough for real-time use. In another perspective, CO sensors are usually placed in kitchen or somewhere the fire could combust incompletely (which means sensor follows the machine). It would be much safer if the sensor can follow people/user and deliver warning message when people/user encounter a high(er) CO concentration environment, which means close-proximity use is crucial.

There is a pressing need for improving the prior art.

SUMMARY OF THE INVENTION

It is therefore a primary objective of the present application to provide an air quality sensing module in a handheld device. Also, the present application further provides a related air pump.

An embodiment of the present application discloses an air quality sensing module including a chamber, an air quality sensor and an air pump. The air quality sensing module is disposed or to be disposed within a handheld device. The air pump produces an airflow toward or away from the chamber, for the air quality sensor to perform an air quality sensing operation. A direction of the airflow produced by the air pump within the handheld device is reversible.

An embodiment of the present application discloses an air pump including a first flap, a second flap, a first actuator, a second actuator and an anchor structure. The first flap and the second flap are opposite to each other in a top view viewing along a top-view direction. The first actuator is disposed on the first flap, and the second actuator is disposed on the second flap. The first flap includes a first anchored edge anchored on the anchor structure, and the first flap includes first free edges other than the first anchored edge which are non-anchored. The second flap includes a second anchored edge anchored on the anchor structure, and the second flap includes second free edges other than the second anchored edge which are non-anchored.

These and other objectives of the present invention will no doubt become obvious to those of ordinary skill in the art after reading the following detailed description of the preferred embodiment that is illustrated in the various figures and drawings.

DETAILED DESCRIPTION

In the present invention, the technical features described in the embodiments may be mixed or combined in various ways as long as there are no conflicts between them.

In the present invention, an airflow generating component is configured to generate an airflow, wherein the airflow generating component may be applied in cooling, drying, dehumidifying, heat dissipation, ventilation, air-sampling and/or air-pumping applications by generating the airflow. In the present invention, the airflow generating component may be designed based on requirement(s), and the airflow generating component may be formed by any suitable method. In the following, some embodiments of the airflow generating component are explained.

For example, the airflow generating component may be an air pump or an airflow generating chip, wherein the air pump or airflow generating chip may be formed by a semiconductor manufacturing process. For example, the airflow generating chip may be a micro electro mechanical system (MEMS) chip including a MEMS structure, but not limited thereto.

In the present application, "air pump" and "airflow generating component/chip" refer to the same component and are used interchangeably. Furthermore, the "air pump" and/or "airflow generating component/chip" may realize a fan-on-chip concept, i.e., a component with small size (as small as chip size, where chip length/width can be realized to be less than 15 millimeter (mm)) capable of generating airflow.

Thanks to the small size (as small as chip size with chip length/width less than 15 mm), it is possible to dispose air quality sensing module comprising the airflow generating component/chip in handheld electronic device, and therefore real-time and close-proximity air quality sensing is realizable.

Figure 1:
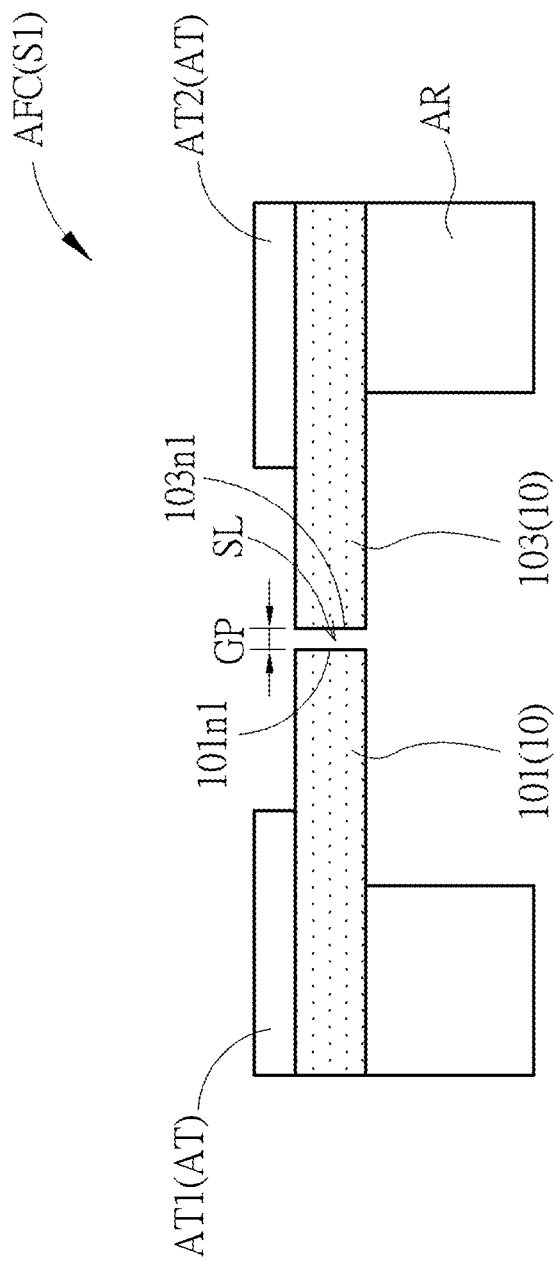
FIG. 1 is a schematic diagram of a cross sectional view illustrating an air pump according to an embodiment of the present invention.
Figure 2:
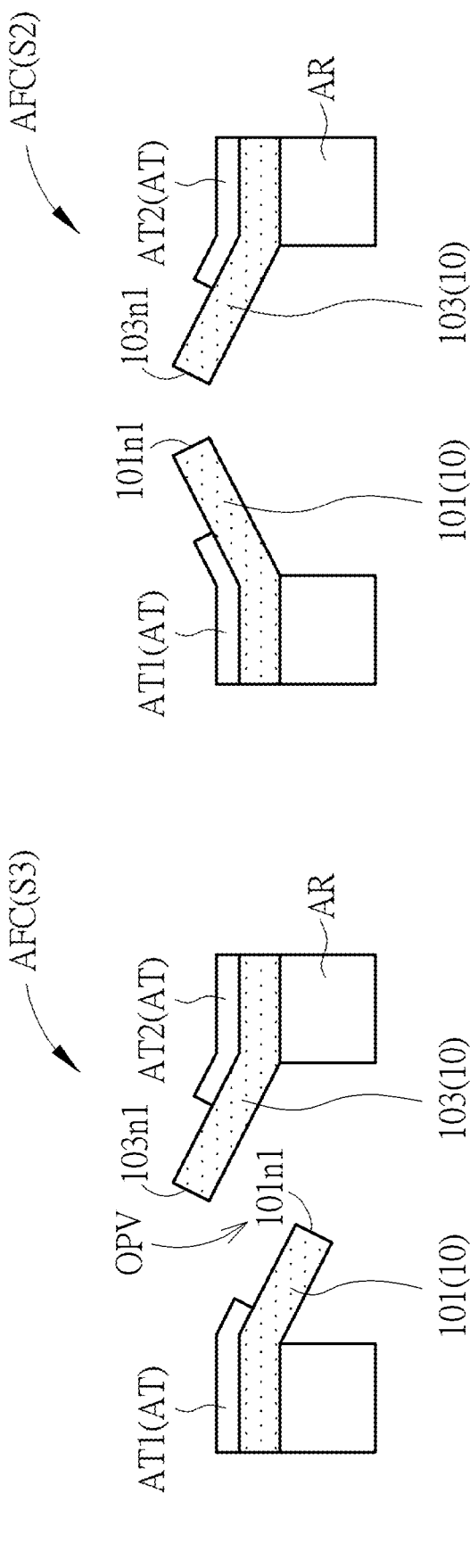
FIG. 2 is a schematic diagram of a cross sectional view illustrating a common mode movement and a differential mode movement of the air pump according to an embodiment of the present invention.

Referring to FIG. 1 and FIG. 2, FIG. 1 is a schematic diagram of a cross sectional view illustrating an air pump according to an embodiment of the present invention, and FIG. 2 is a schematic diagram of a cross sectional view illustrating a common mode movement and a differential mode movement of the air pump according to an embodiment of the present invention, wherein the air pump AFC shown in FIG. 1 is in an intermediate status S1. As shown in FIG. 1 and FIG. 2, the air pump AFC is configured to generate an airflow. In some embodiments, the air pump AFC may be configured to produce a plurality of air pulses, and the airflow may consist of the air pulses, wherein the air pump AFC may produce the air pulses at any suitable pulse rate. For example, the air pump AFC may produce the air pulses at an ultrasonic (pulse) rate higher than a maximum human audible frequency (e.g., 16 kHz, 20 kHz or 22 kHz), such that the user cannot hear the operation of the air pump AFC configured to generate the airflow and/or the air pulses, but not limited thereto.

As shown in FIG. 1, the air pump AFC may include at least one anchor structure AR and at least one film structure 10 anchored by/on the anchor structure AR, wherein the anchor structure AR may be disposed outside the film structure 10. The film structure 10 and the anchor structure AR may include any suitable material(s). In some embodiments, the film structure 10 and the anchor structure AR may individually include silicon (e.g., single crystalline silicon or poly-crystalline silicon), silicon compound (e.g., silicon carbide, silicon oxide), germanium, germanium compound, gallium, gallium compound (e.g., gallium nitride or gallium arsenide), other suitable material or a combination thereof, but not limited thereto. In some embodiments, the film structure 10 and the anchor structure AR may have the same material.

In the operation of the air pump AFC, the film structure 10 may be actuated to have a movement, and the anchor structure AR may be immobilized. Namely, the anchor structure AR may be a fixed end (or fixed edge) respecting the film structure 10 during the operation of the air pump AFC. In some embodiments, the film structure 10 may be actuated to move upwards and downwards, but not limited thereto. In the present invention, the terms "move upwards" and "move downwards" represent that the film structure 10 moves substantially along a direction Z. Moreover, "upwards" may refer to the direction Z (i.e., +Z direction) while "downwards" may refer to a direction opposite to the direction Z (i.e., −Z direction). Namely, an actuating direction of the film structure 10 is parallel to the direction Z. In an embodiment, the direction Z may be a vertical direction and/or a top-view direction.

As shown in FIG. 1, the film structure 10 of the air pump AFC includes at least one slit SL, and the film structure 10 is divided into a plurality of flaps (e.g., flaps 101 and 103) by the slit(s) SL (i.e., the flaps are separated from each other by the slit(s) SL, and the slit(s) SL may be boundaries of the flaps), wherein the number of the flaps may be designed based on requirement(s). For example, as shown in FIG. 1, the film structure 10 may be divided into a flap 101 and a flap 103 by the slit(s) SL, the flap 101 and the flap 103 may be disposed opposite to each other, and at least one slit SL may be between the flap 101 and the flap 103. Note that the flap 101 and the flap 103 opposite to each other may form a flap pair in the film structure 10.

In FIG. 1, each of the flaps 101 and 103 of the film structure 10 has at least one anchor edge (or anchor end) anchored on the anchor structure AR and at least one free edge (or free end) which is not permanently anchored on any component within the air pump AFC, and the anchor edge(s) and the free edge(s) of each of the flaps 101 and 103 may be designed based on requirement(s). For example (as shown in FIG. 1), the slit SL may define one free edge (e.g., a first free edge 101n1) of the flap 101 and one free edge (e.g., a second free edge 103n1) of the flap 103, this free edge (e.g., the first free edge 101n1) of the flap 101 may be opposite to the anchor edge of the flap 101, and this free edge (e.g., the second free edge 103n1) of the flap 103 may be opposite to the anchor edge of the flap 103, but not limited thereto.

In the present invention, the number of the slit(s) SL included in the film structure 10 may be adjusted based on requirement(s), and the slit(s) SL may be disposed at any suitable position of the film structure 10 and have any suitable top-view pattern. For example, the slit SL may be a straight slit, a curved slit, a combination of straight slits, a combination of curved slits or a combination of straight slit(s) and curved slit(s).

The air pump AFC may include an actuator AT configured to actuate the film structure 10 to generate the airflow and/or the air pulses, wherein the actuator AT may be disposed at any suitable position, and the position of the actuator AT may be related to the actuating method of the actuator AT. For instance, in FIG. 1, the actuator AT may overlap the film structure 10 in the direction Z, but not limited thereto. For instance, in FIG. 1, the actuator AT may be disposed on the film structure 10, but not limited thereto. For instance, in FIG. 1, the actuator AT may be in contact with the film structure 10, but not limited thereto. As shown in FIG. 1, the actuator AT may be divided into an actuator AT1 disposed on the flap 101 and an actuator AT2 disposed on the flap 103.

The actuator AT has a monotonic electromechanical converting function with respect to the movement of the film structure 10 along the direction Z. In some embodiments, the actuator AT may include a piezoelectric actuator, an electrostatic actuator, a nanoscopic-electrostatic-drive (NED) actuator, an electromagnetic actuator or any other suitable actuator, but not limited thereto. For example, in an embodiment, the actuator AT may include a piezoelectric actuator, the piezoelectric actuator may contain such as two electrodes and a piezoelectric material layer (e.g., lead zirconate titanate, PZT) disposed between the electrodes, wherein the piezoelectric material layer may actuate the film structure 10 based on driving signals (e.g., driving voltages and/or driving voltage difference between two electrodes) received by the electrodes, but not limited thereto. For example, in another embodiment, the actuator AT may include an electromagnetic actuator (such as a planar coil), wherein the electromagnetic actuator may actuate the film structure 10 based on a received driving signals (e.g., driving current) and a magnetic field (i.e. the film structure 10 may be actuated by the electromagnetic force), but not limited thereto. For example, in still another embodiment, the actuator AT may include an electrostatic actuator (such as conducting plate) or a NED actuator, wherein the electrostatic actuator or the NED actuator may actuate the film structure 10 based on a received driving signals (e.g., driving voltage) and an electrostatic field (i.e. the film structure 10 may be actuated by the electrostatic force), but not limited thereto. In the following, the actuator AT may be a piezoelectric actuator for example.

For example, if the air pump AFC is a MEMS chip, the film structure 10, the anchor structure AR and the actuator AT are MEMS structures in the MEMS chip, but not limited thereto. Furthermore, since the air pump AFC generates the airflow and/or the air pulses by actuating the film structure 10 through the actuator AT, the air pump AFC may be a bladeless fan, but not limited thereto.

In the present invention, the film structure 10 (the flaps 101 and 103) is actuated/controlled to move upwards and downwards by the actuator AT, such that a vent opening OPV related to the slit SL is formed/opened or closed (i.e., the film structure 10 is configured to form/open or close the vent opening OPV), wherein the vent opening OPV is formed between opposite sidewalls of the slit SL (i.e., the vent opening OPV is formed between the flap 101 and the flap 103). Namely, the vent opening OPV is formed because of the slit SL. In the condition "the vent opening OPV is closed/sealed", the air is hard to flow to pass through a space between two opposite sidewalls of the slit SL, meaning that a flowing resistance of the vent opening OPV is large or larger than a threshold. In the condition "the vent opening OPV is formed/opened", the air easily flows to pass through a space between two opposite sidewalls of the slit SL, meaning that the flowing resistance of the vent opening OPV is low or lower than another threshold.

In the present invention, the air pump AFC may generate the airflow and/or the air pulse by any suitable airflow producing method. For example, an airflow producing method related to FIG. 1 and FIG. 2 are described in the following, and this airflow producing method generates the airflow and/or the air pulse by changing the state of the vent opening OPV and changing the air pressures on two opposite sides of the film structure 10.

As shown in FIG. 1, in the intermediate status S1 of the air pump AFC, the film structure 10 (the flap pair) may be actuated and maintained as a first position which is substantially horizontal in the cross sectional view, and the vent opening OPV may be temporarily closed (or even temporarily sealed), such that the air may be hard to flow to pass through a space between two opposite sidewalls of the slit SL. In FIG. 1, two opposite sidewalls of the slit SL (i.e., the first free edge 101n1 of the flap 101 and the second free edge 103n1 of the flap 103) partially or fully overlap with each other in a horizontal direction (a gap of the slit SL is shown in FIG. 1), so as to make the vent opening OPV closed and have the larger flowing resistance. In an embodiment, the horizontal direction generally means a direction parallel to a horizontal plane, such as a direction X and a direction Y perpendicular to the direction Z.

In FIG. 1, since a size of the gap GP of the slit SL (or a width of the slit SL) should be sufficiently small, the airflow through the gap GP (i.e., a narrow channel) can be highly damped due to viscous forces/resistance along the walls of the airflow pathways, known as boundary layer effect within field of fluid mechanics. Accordingly, the airflow flowing through the gap GP in the intermediate status S1 is significantly small or negligible. In other words, when the air pump AFC is in the intermediate status S1, the vent opening OPV is closed and even sealed. The size of the gap GP of the slit SL (or a width of the slit SL) may be designed based on requirement(s). For instance, the size of the gap GP of the slit SL (or a width of the slit SL) may be less than or equal to 5 µm, less than or equal to 3 µm, or less than or equal to 2 µm, or may range from 1 µm to 2 µm, but not limited thereto. Note that the size of the vent opening OPV in the intermediate status S1 is equivalent to the size of the gap GP.

In FIG. 2, the film structure 10 (the flap pair) may be actuated to perform a common mode movement S2, such that the flap 101 and the flap 103 are simultaneously actuated to move toward the same direction. For example, the flap 101 and the flap 103 may be simultaneously actuated to move upwards or downwards along the direction Z. For example, in the end of the common mode movement S2, a distance between the flap 101 and the first position and a distance between the flap 103 and the first position are the same.

As shown in FIG. 2, when the film structure 10 (the flap pair) is actuated to perform the common mode movement S2, the vent opening OPV may be temporarily closed (or even temporarily sealed), such that the air may be hard to flow to pass through a space between two opposite sidewalls of the slit SL. In FIG. 2, two opposite sidewalls of the slit SL (i.e., the first free edge 101n1 of the flap 101 and the second free edge 103n1 of the flap 103) partially or fully overlap with each other in the horizontal direction, so as to make the vent opening OPV closed and have the larger flowing resistance.

When the film structure 10 (the flap pair) is actuated to perform the common mode movement S2, since the vent opening OPV is temporarily closed and has the larger flowing resistance, the air pressures on two opposite sides of the film structure 10 are different to cause an air-pressure difference. Namely, the film structure 10 (the flap pair) performs the common mode movement S2 to form an air pressure variation.

In FIG. 2, the film structure 10 (the flap pair) may be actuated to perform a differential mode movement S3, such that the flap 101 and the flap 103 are simultaneously actuated to move toward opposite directions. For example, the flap 101 may be actuated to move downwards and the flap 103 may be actuated to move upwards (as shown in FIG. 2), or the flap 101 may be actuated to move upwards and the flap 103 may be actuated to move downwards. For example, in the end of the differential mode movement S3, a distance between the flap 101 and the first position and a distance between the flap 103 and the first position are the same.

As shown in FIG. 2, when the film structure 10 (the flap pair) is actuated to perform the differential mode movement S3, the vent opening OPV may be temporarily opened, such that the air may easily flow to pass through a space between two opposite sidewalls of the slit SL. In FIG. 2, two opposite sidewalls of the slit SL (i.e., the first free edge 101n1 of the flap 101 and the second free edge 103n1 of the flap 103) do not overlap with each other in the horizontal direction, so as to make the vent opening OPV opened and have the lower flowing resistance.

When the film structure 10 (the flap pair) is actuated to perform the differential mode movement S3, if the air-pressure difference exists between two opposite sides of the film structure 10, the air naturally flows to pass through the vent opening OPV due to this air-pressure difference and the lower flowing resistance of the vent opening OPV, such that the airflow and/or the air pulse can be generated.

Accordingly, the airflow producing method of this embodiment may generate the airflow and/or the air pulse by actuating the film structure 10 (the flap pair) to perform the common mode movement S2 and the differential mode movement S3. For instance, one period of the airflow producing method of this embodiment may include four steps, but not limited thereto. The first step of the airflow producing method may be that the film structure 10 (the flap pair) is actuated to perform the common mode movement S2 to make the air-pressure difference exist between two opposite sides of the film structure 10. The second step of the airflow producing method may be that the film structure 10 (the flap pair) is actuated to recover the intermediate status S1. The third step of the airflow producing method may be that the film structure 10 (the flap pair) is actuated to perform the differential mode movement S3 to make air naturally flows to pass through the vent opening OPV due to this air-pressure difference and the lower flowing resistance of the vent opening OPV, such that the airflow and/or the air pulse can be generated. The fourth step of the airflow producing method may be that the film structure 10 (the flap pair) is actuated to recover the intermediate status S1. By repeating the periods of the airflow producing method of this embodiment, the air pulses may form the airflow continuously.

A frequency of the period may be designed based on the pulse rate of the air pulse, wherein the frequency of the period may be synchronous with the pulse rate of the air pulse. In the present invention, a frequency/rate is synchronous with another frequency/rate generally refers that this frequency/rate is this another frequency/rate times a rational number (i.e., N/M, wherein N and M represent integers). In some embodiments, the frequency of the period may be the same as the pulse rate of the air pulse. In some embodiments, the film structure 10 (the flap pair) performs the common mode movement S2 to form the air pressure variation with a pressure variant frequency synchronous with the frequency of the period, and the film structure 10 (the flap pair) performs the differential mode movement S3 to form the vent opening OPV at an opening rate synchronous with the pressure variant frequency and the frequency of the period. For instance, the frequency of the period, the pulse rate of the air pulse, the pressure variant frequency and the opening rate are the same. For instance, if the air pump AFC produces the air pulses at an ultrasonic rate, the pressure variant frequency and the opening rate are synchronous with this ultrasonic rate.

Flowing directions of the airflow and the air pulse are determined by a direction of the common mode movement S2 performed by the film structure 10 (the flap pair). When the film structure 10 (the flap pair) is actuated to move upwards (or downwards) for only performing one type of common mode movement S2 in the first step of the several periods, the types of the air-pressure differences in the first step of these periods are the same, thereby making the flowing directions of the air pulses generated in these periods (the third step) be the same. Thus, the air pump AFC shall produce single-ended (SE) air pulses or SE-liker air pulses. Also, the air pulse may be asymmetric.

In the present invention, a waveform of the SE air pulse or a waveform of the SE-liker air pulse may refer that the waveform is (substantially) unipolar with respect to certain level. For instance, the SE air pulse or the SE-liker air pulse may refer to the waveform which is (substantially) unipolar with respect to ambient pressure (e.g., 1 ATM). Namely, the SE air pulses or the SE-liker air pulses constitute a net air movement or a net airflow toward one single direction.

The airflow producing method of the present invention is not limited by the above. In one period of the airflow producing method, the number of the steps and the order of the actuating movements of the film structure 10 (the flap pair) may be designed based on requirement(s).

In another aspect, for any common mode movements S2 of the flap pair, a pair of acoustic pressure waves will be produced, one in space on a side of the film structure 10, and one in space on an opposite side of the film structure 10. These two acoustic pressure waves will be of the same magnitude but of opposite polarities. As a result, when the vent opening OPV is opened, the air-pressure difference between the two air volumes in the vicinity of the vent opening OPV would neutralize each other. Therefore, when the timing of differential mode movement S3 reaching its peak (i.e., the timing which the vent opening OPV is maximum) is aligned to the timing of acceleration of common mode movement S2 reaching its peak, the acoustic pressure supposed to be generated by the common mode movement S2 shall be subdued/eliminated due to the opening of the vent opening OPV, causing the auto-neutralization between two acoustic pressures on the two opposite sides of the film structure 10, where the two acoustic pressures would have same magnitude but opposite polarities. It means, when the vent opening OPV is opened, the air pump AFC would produce (near) net-zero air pressure. Therefore, when the opened period of the vent opening OPV overlaps a time period of one of the (two) polarities of acceleration of common mode movement S2 of the flap pair, the air pump AFC shall produce SE air pulses or SE-liker air pulses.

Furthermore, by aligning the timing of opening of the vent opening OPV to the timing of acceleration of common mode movement S2 of the flap pair, the air pump AFC would be able to produce asymmetric air pulses.

In some embodiments, the film structure 10 (the flap pair) may be actuated to perform the common mode movement S2 and the differential mode movement S3 simultaneously, but not limited thereto. In some embodiments, the film structure 10 may include other part to make the common mode movement S2 and the differential mode movement S3 be performed by the film structure 10 simultaneously, but not limited thereto.

In the present invention, the actuator AT may receive any suitable signal to actuate the film structure 10. In some embodiments, the film structure 10 is actuated by a modulation-driving signal SM to perform the common mode movement S2 to form the air pressure variation, and the film structure 10 is actuated by a demodulation-driving signal SV to perform the differential mode movement S3 to form the vent opening OPV, wherein both the modulation-driving signal SM and the demodulation-driving signal SV are related to an output amplitude of the air pulse. Note that the demodulation-driving signal SV may be +SV or −SV shown in FIG. 4.

Furthermore, a modulation frequency of the modulation-driving signal SM and a demodulation frequency of the demodulation-driving signal SV are related to the pulse rate of the air pulse. For example, the modulation frequency and the demodulation frequency may be synchronous with the pulse rate of the air pulse, such that the modulation frequency and the demodulation frequency may be synchronous with the pressure variant frequency of the air pressure variation, the opening rate of the vent opening OPV and the frequency of the period, but not limited thereto.

In some embodiments, the actuator AT may receive the modulation-driving signal SM and the demodulation-driving signal SV at different times, but not limited thereto. In some embodiments, the actuator AT may include a plurality subparts in the top view, one sub-part may receive the modulation-driving signal SM, and another sub-part may receive the demodulation-driving signal SV, but not limited thereto. In some embodiments, the actuator AT may include a first electrode and a second electrode, the first electrode may receive the modulation-driving signal SM, and the second electrode may receive the demodulation-driving signal SV, but not limited thereto.

Furthermore, by controlling the modulation-driving signal SM and/or the demodulation-driving signal SV, the flowing direction of the airflow (the air pulse) produced by the air pump AFC may be reversible. Details of which may be referred to U.S. patent application Ser. No. 18/624,105, which are not narrated herein for brevity.

The details of the airflow generating MEMS device (which may be fabricated by semiconductor process), i.e., the air pump AFC (e.g., the structure, the driving signal and the movement) and their design/operational principles can be referred to U.S. Pat. No. 11,943,585, U.S. patent application Ser. No. 18/321,757 and U.S. patent application Ser. No. 18/624,105 filed by same applicant. Thus, the contents of these US patents and US applications are incorporated herein by reference.

As mentioned earlier, the air pump AFC of the present application may be capable of producing asymmetric air pulses, and can be applied in cooling, drying, dehumidifying, heat dissipation, ventilation, air-sampling and/or air-pumping applications, where the (asymmetric) air pulses are produced to form a net air movement constantly in one direction.

Furthermore, the air pump AFC of the present invention for airflow applications may be disposed within an air quality sensing device, which is to sense, e.g., a density of specific particle(s) (e.g., PM 2.5 or PM 10 (PM: Particulate Matter)) or compound(s) (e.g., ozone ($O_3$), nitrogen dioxide ($NO_2$), sulfur dioxide ($SO_2$) and carbon monoxide (CO)) in the air. Hence, a size of the air quality sensing device may be significantly reduced.

Figure 3:
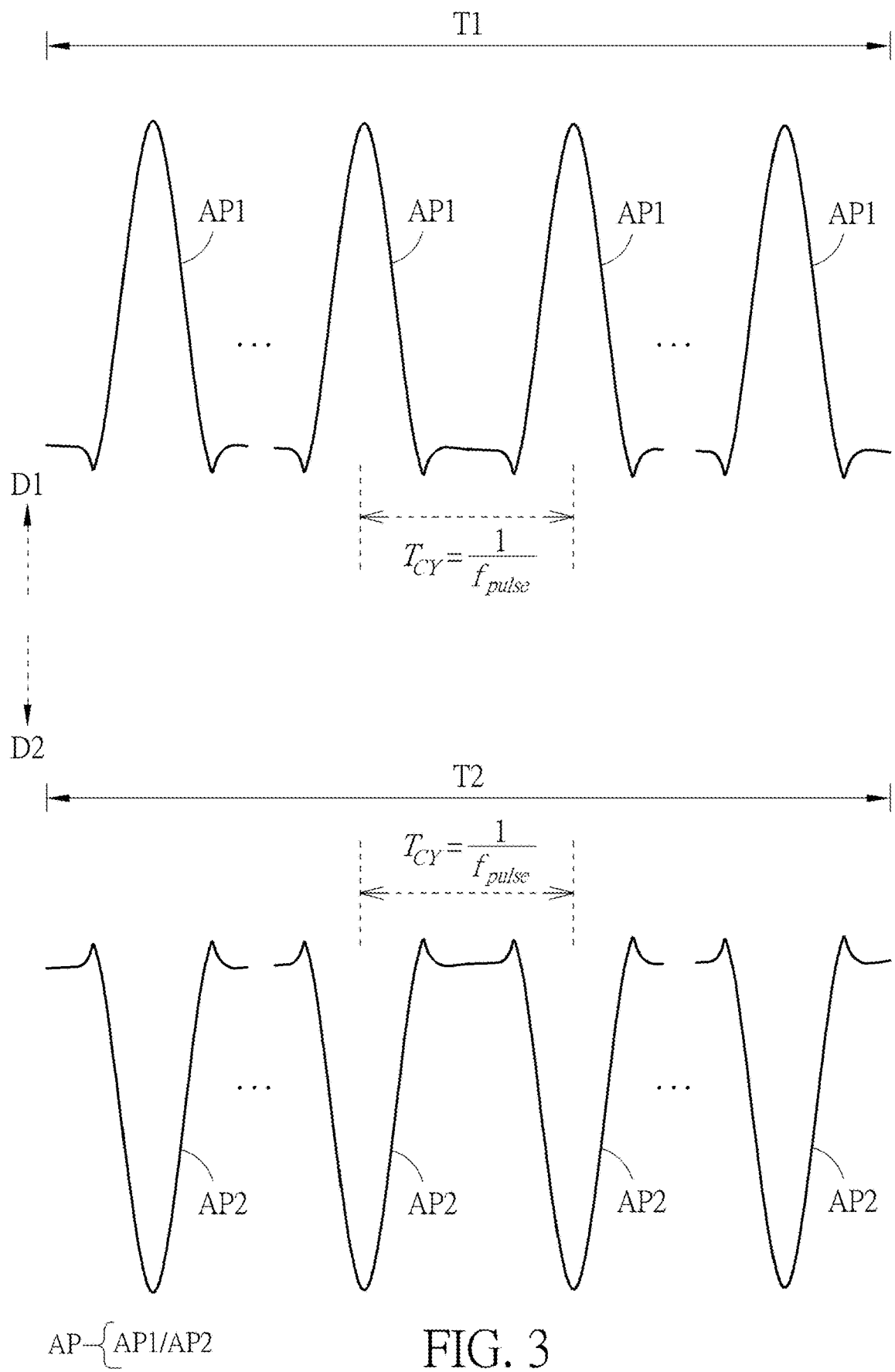
FIG. 3 is a schematic diagram of air pulses according to an embodiment of the present invention.

For example, FIG. 3 illustrates a schematic diagram of air pulses AP according to an embodiment of the present invention. The air pulses may be generated by the air pump AFC of present application, which comprises a film structure 10. As mentioned earlier, the film structure 10 of the air pump AFC may be actuated to perform a movement to generate the air pulses AP at an ultrasonic rate $f_{pulse}$ (e.g., 96 KHz or 192 KHz), which may be a reciprocal of the operating cycle $T_{CY}$ of the ultrasonic carrier frequency $f_{UC}$ for example. In this case, the ultrasonic rate $f_{pulse}$ may be the ultrasonic carrier frequency $f_{UC}$. The air pulses AP may produce a net airflow toward a single direction.

In an embodiment, first air pulses AP1 may produce a first net airflow constantly toward one single direction, e.g., a first direction D1. Taking FIG. 3 as an example, during the first period of time T1, the air pulses AP are all toward first direction D1. When the first time period T1 is at least or longer than a reciprocal of a minimum audible frequency, the first net airflow produced by the first air pulses AP1 may be considered as constantly toward one single direction D1. For example, for a minimum audible frequency being acknowledged as 10 Hz, when the first time period T1 is at least or longer than 0.1 second, the first net airflow may be considered as constantly toward one single direction D1. Note that, first amplitude(s), corresponding to the first air pulses AP1 toward the first direction D1, may or may not be the same.

On the other hand, the air pump AFC may produce second air pulses AP2, and the second air pulses AP2 may produce a second net airflow constantly toward a second direction D2, opposite to the first direction D1. In an embodiment, when the air pump AFC produces significant airflow or air movement and the air pulses toggling between the first direction D1 and the second direction D2 is not discernible, the first net airflow may be considered as constantly toward direction D1 during period T1, and/or the second net airflow may be considered as constantly toward direction D2 during period T2.

The film structure may be actuated by a demodulating-driving signal (e.g., ±SV) and a modulating-driving signal (e.g., SM). Note that, in the present application, SM may be referred to modulation signal, which is also a kind of driving signal. Similarly, ±SV may be referred to demodulation signal, which is also a kind of driving signal.

Figure 4:
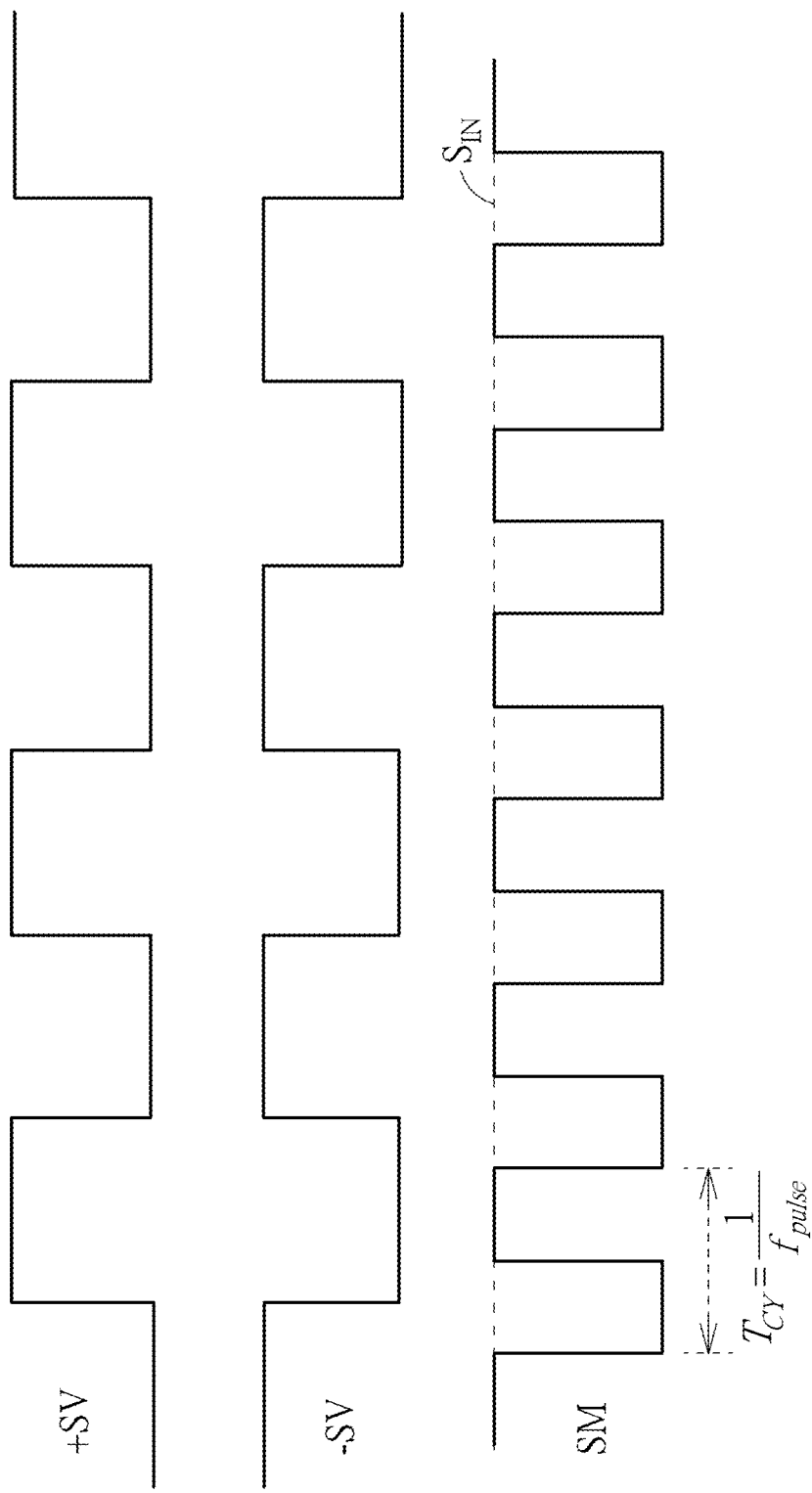
FIG. 4 illustrates waveforms of demodulation signals and a modulation signal according to an embodiment of the present invention.

FIG. 4 illustrates schematic waveforms of the demodulation signals (±SV) and the modulation signal (SM) according to another embodiment of the present invention, neglecting transition between high/low voltages thereof. As shown in FIG. 4, the modulation/driving signal (SM) may be generated according to an input signal (e.g., a input audio signal $S_{IN}$), which comprises or is a (nonzero) direct current (DC) offset (e.g., a (nonzero) DC voltage). In other words, the input signal may be simply a DC signal, but not limited thereto.

In an embodiment, the DC offset may be related to the direction of the net airflow. For example, during a first period of time T1, the air pulses (AP) may produce a first net airflow constantly toward the first direction D1 in response to the DC offset being positive. On the other hand, during a second period of time T2, the air pulses generated by the air pump AFC may produce the second net airflow constantly toward the second direction D2, which is opposite to the first direction D1, in response to the DC offset being negative. In this regard, the air pump AFC or airflow generating device of the present invention may be viewed as a voltage-to-airflow converter, which can convert voltage into airflow.

In addition to polarity of the DC offset, the direction of net airflow may also be determined/controlled via phase between the modulation signal (SM) and the demodulation signal (±SV). For example, in FIG. 4, transitions of the demodulation signal (±SV) are aligned to interval of the modulation signal (SM) being low. In this case, the air pump AFC may produce airflow toward a third direction for example. When (phase of) the demodulation signal (±SV) is shifted such that transitions of the demodulation signal (±SV) are aligned to interval of the modulation signal (SM) being high, the air pump AFC would produce airflow toward a fourth direction opposite to the third direction. In short, the direction of the net airflow produce by the air pump AFC may be determined/controlled via phase (difference) between the modulation signal (SM) and the demodulation signal (±SV).

The strength/volume of a net airflow may be related to or a function of the magnitude of the DC offset. By maintaining an airflow direction (either the first direction or the second direction), the air pump AFC is able to dissipate heat, dehumidify, provide ventilation, provide air-sampling application, provide air-pumping application and/or facilitate air circulation. In this case, the air pump AFC can be regarded as a fanless blower (i.e., a bladeless fan). That is, the air pump AFC may also be regarded as fanless blower, especially when the driving signal or modulation-driving signal applied thereto is generated according to an input signal comprising nonzero DC component/offset. In the present invention, the terms of air-pulse generating device, airflow generating device, air pump and blower may be used interchangeably.

Due to the small size of the air pump of the present invention, it is possible for an air quality sensing module comprising the air pump to be disposed within (integrated into) a handheld device. For example, the handheld device may be a (smart) phone, a (smart) watch or other suitable handheld portable device.

Figure 5:
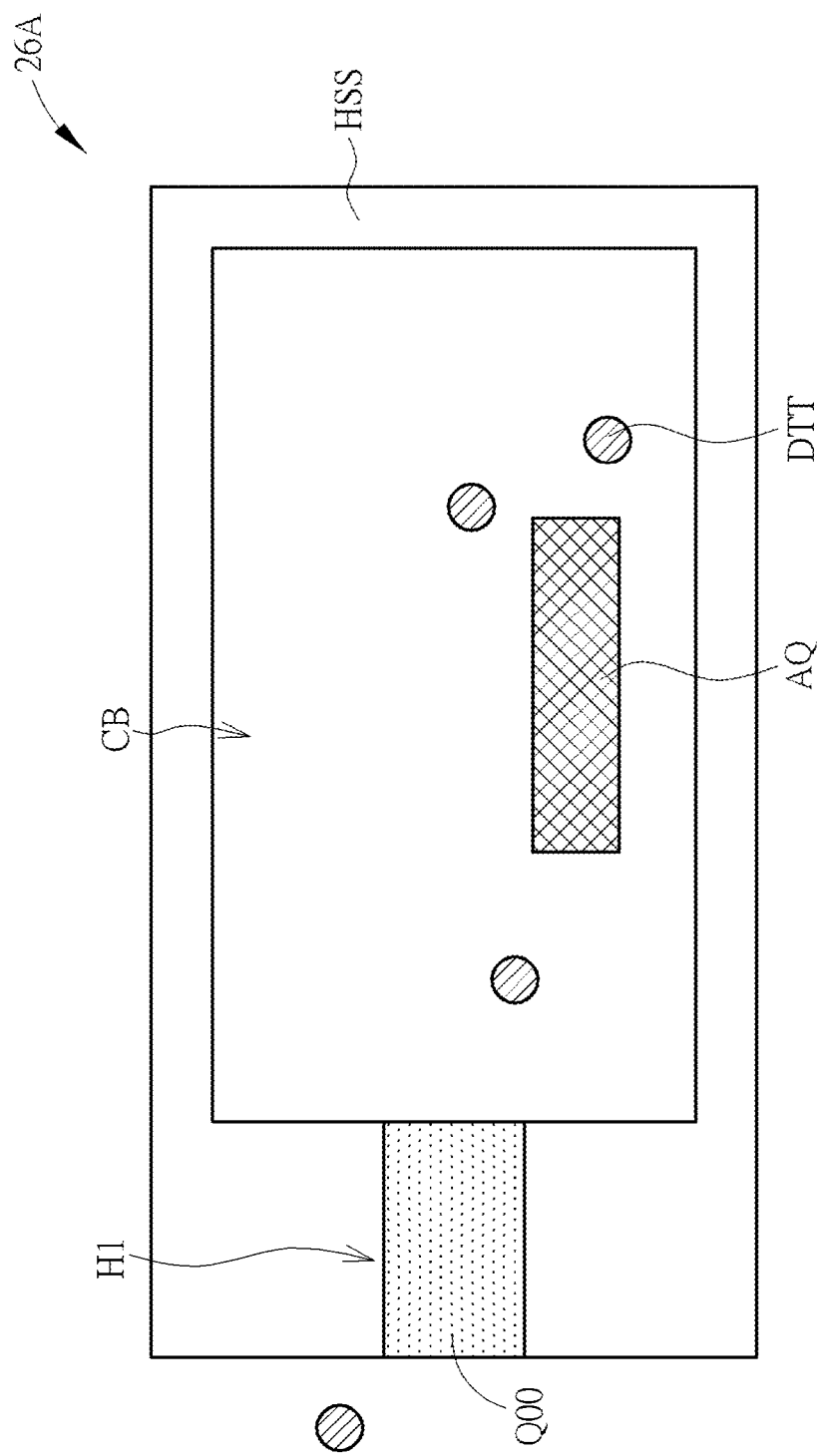
FIG. 5 is a schematic diagram of a cross sectional view illustrating an air quality sensing module according to an embodiment of the present invention.

Referring to FIG. 5, FIG. 5 is a schematic diagram of a cross sectional view illustrating an air quality sensing module according to an embodiment of the present invention. As shown in FIG. 5, the air quality sensing module 26A includes a housing HSS in which a chamber CB exists. The housing HSS may be a one-piece structure or may be formed of a plurality of sub-structures.

As shown in FIG. 5, the air quality sensing module 26A includes an air quality sensor AQ, wherein the air quality sensor AQ is disposed in the housing HSS, and the air quality sensor AQ performs an air quality sensing operation for sensing at least one detecting target DTT, thereby sensing an air quality of the chamber CB. For example, the air quality sensor AQ may sense a density of the detecting target DTT, and the detecting target DTT may include specific particle(s) (e.g., PM 2.5 or PM 10) or compound(s) (e.g., ozone ($O_3$), nitrogen dioxide ($NO_2$), sulfur dioxide ($SO_2$) and carbon monoxide (CO)) in the air, but not limited thereto.

As shown in FIG. 5, the air quality sensing module 26A includes an air pump Q00 which is any one of aforementioned air pump AFC, wherein the air pump Q00 produces the airflow toward or away from the chamber CB for the air quality sensor AQ to perform the air quality sensing operation. For instance, the air pump Q00 may be disposed in or corresponding to a hole H1 of the housing HSS, such that the air pump Q00 may produce the airflow from an ambient toward the chamber CB or from the chamber CB toward the ambient.

The direction of the airflow may be designed based on the type of the air quality sensing module 26A and other requirement(s). For instance (as shown in FIG. 5), the air pump Q00 produces a first airflow from the ambient toward the chamber CB so that the air quality sensor AQ senses the air quality of the ambient during a first time, and the air pump Q00 produces a second airflow from the chamber CB toward the ambient to refresh the chamber CB during a second time (i.e., the direction of the airflow produced by the air pump Q00 of the present invention is reversible). Namely, the air pump Q00 can pump the air into the chamber CB and pump the air out the chamber CB in different times. Note that the pressure of the chamber CB during the first time may be greater than the pressure of the chamber CB during the second time. For instance, the pressure of the chamber CB during the first time may be greater than the pressure of the ambient, but not limited thereto.

As mentioned earlier, the direction of the airflow can be reversed by changing phase (difference) between the modulation signal (SM) and the demodulation signal (±SV), or by changing the DC offset embedded within the input signal (e.g., the input audio signal $S_{IN}$) according to which the modulation-driving signal SM is generated.

In addition, airflow strength produced by the air pump Q00 of the present invention is also adjustable. The airflow strength can be adjusted via adjusting an amplitude of the modulation signal (SM) or an amplitude of the demodulation signal (±SV). The airflow strength can also be adjusted via adjusting a frequency of the modulation signal (SM) or the demodulation signal (±SV), exploiting the resonance gain of the film structure 10 (e.g., the flap pair) especially when the frequency of the modulation signal (SM) or the frequency of the demodulation signal (±SV) approaches the resonance frequency of the film structure 10.

Figure 6:
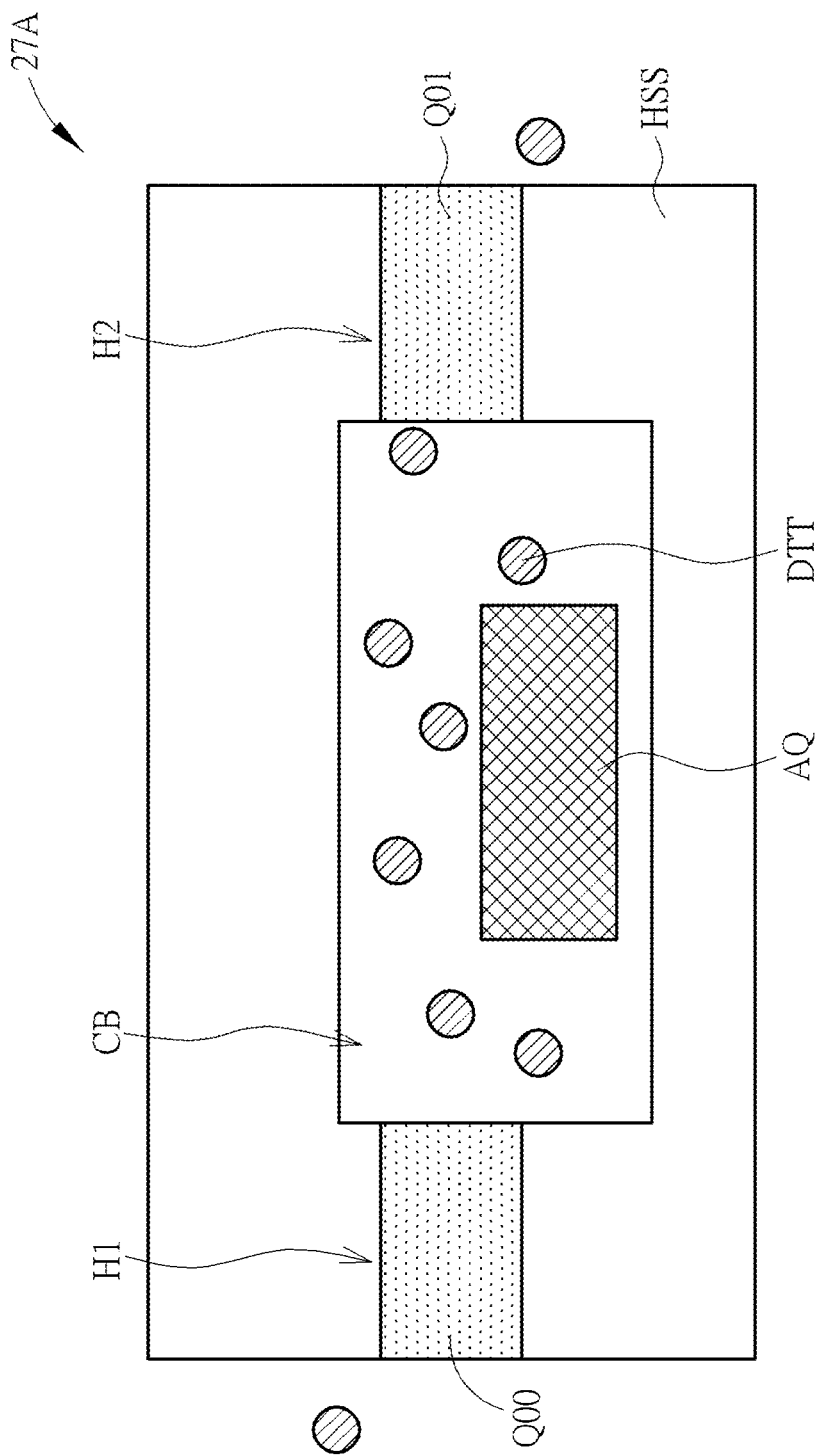
FIG. 6 is a schematic diagram of a cross sectional view illustrating an air quality sensing module according to an embodiment of the present invention.

Referring to FIG. 6, FIG. 6 is a schematic diagram of a cross sectional view illustrating an air quality sensing module according to an embodiment of the present invention. As shown in FIG. 6, another type of the air quality sensing module 27A is provided. In FIG. 6, the air quality sensing module 27A may include another air pump Q01 disposed in or corresponding to a hole H2 of the housing HSS, wherein the structure of the air pump Q01 may be the same as or different from the structure of the air pump Q00. In the present invention, the directions of the airflows produced by the air pumps Q00 and Q01 may be designed based on requirement(s). As an example, the air pump Q00 may produce a first airflow from the ambient toward the chamber CB and the air pump Q01 may produce a third airflow from the ambient toward the chamber CB during a first time, and the air pump Q00 may produce a second airflow from the chamber CB toward the ambient and the air pump Q01 may produce a fourth airflow from the chamber CB toward the ambient during a second time, but not limited thereto. Note that the pressure of the chamber CB during the first time may be greater than the pressure of the chamber CB during the second time.

As another example, the air pump Q00 may produce the airflow from the ambient toward the chamber CB and the air pump Q01 may produce another airflow from the chamber CB toward the ambient simultaneously, or the air pump Q00 may produce the airflow from the chamber CB toward the ambient and the air pump Q01 may produce another airflow from the ambient toward the chamber CB simultaneously (i.e., the directions of the airflows produced by the air pumps Q00 and Q01 of the present invention are reversible), such that the chamber CB may be an air channel, but not limited thereto.

Figure 7:
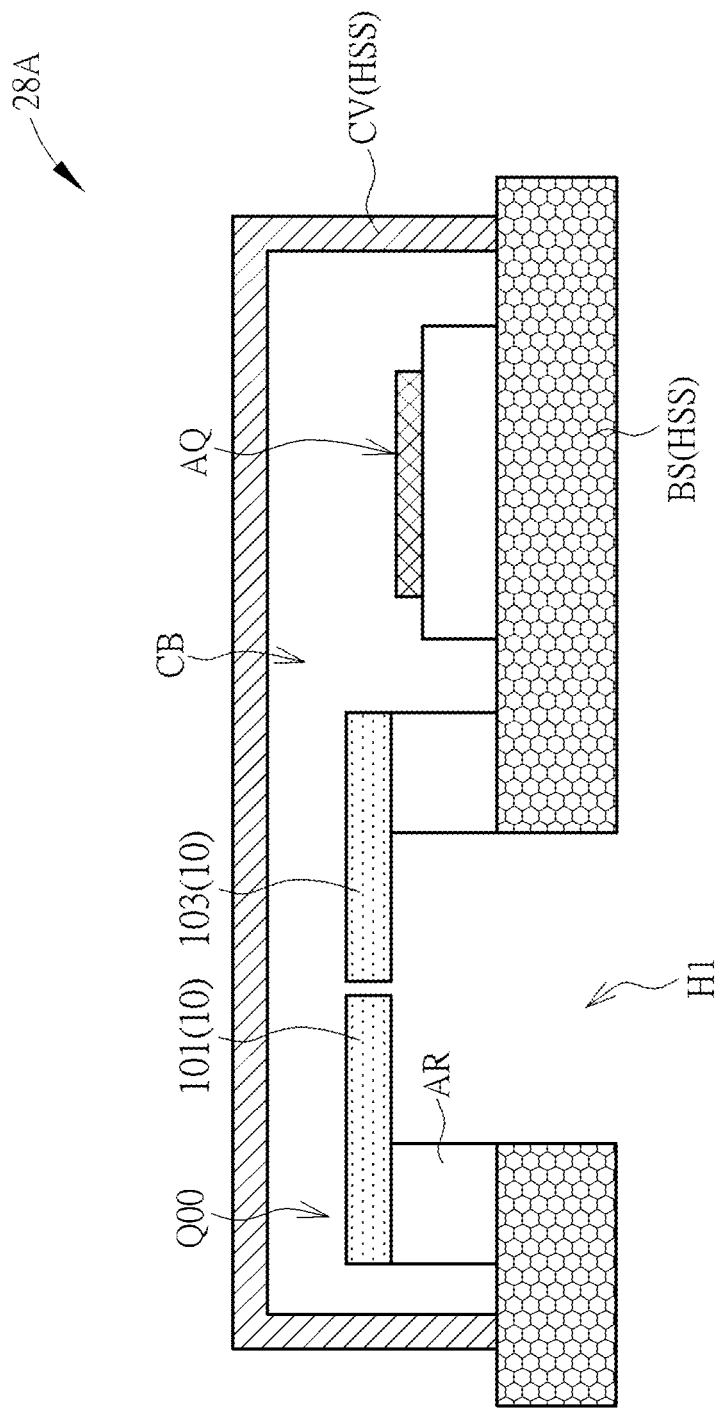
FIG. 7 is a schematic diagram of a cross sectional view illustrating an air quality sensing module according to an embodiment of the present invention.
Figure 7:
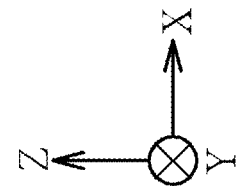
Figure 8:
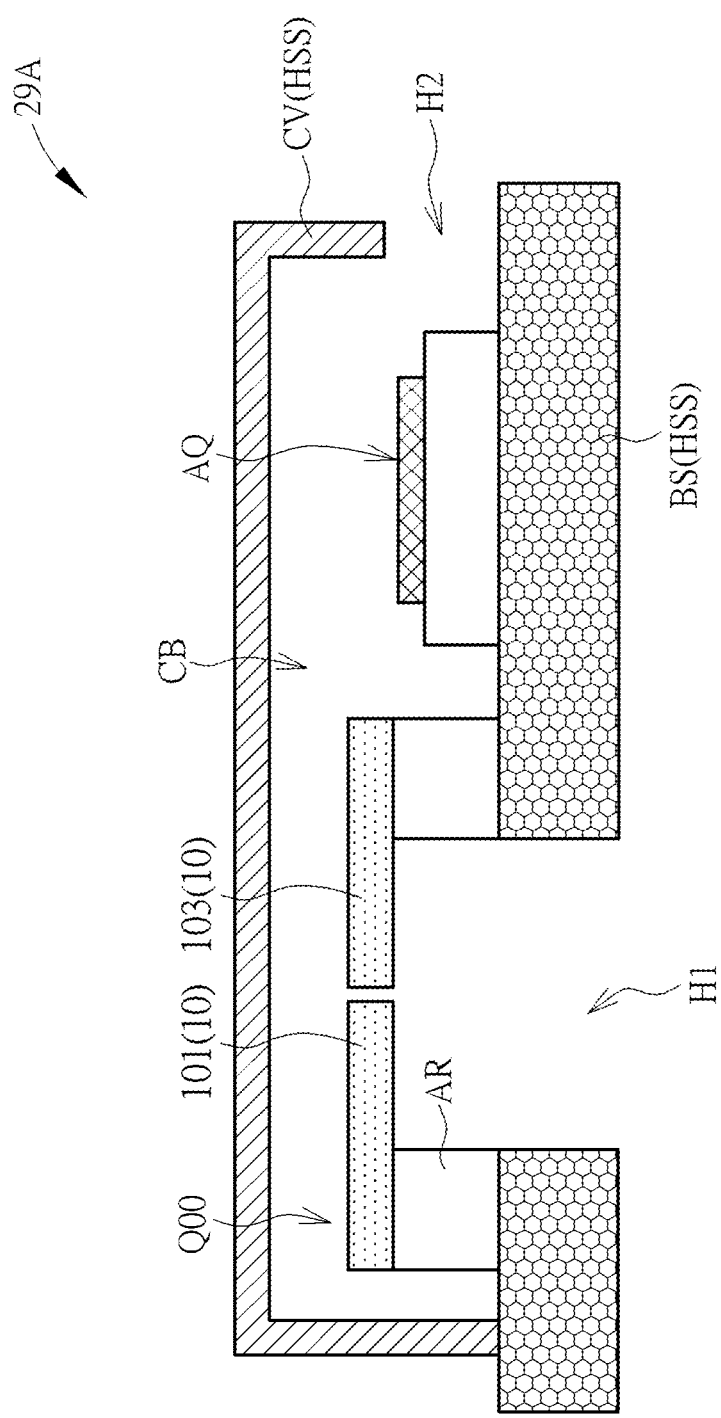
FIG. 8 is a schematic diagram of a cross sectional view illustrating an air quality sensing module according to an embodiment of the present invention.
Figure 9:
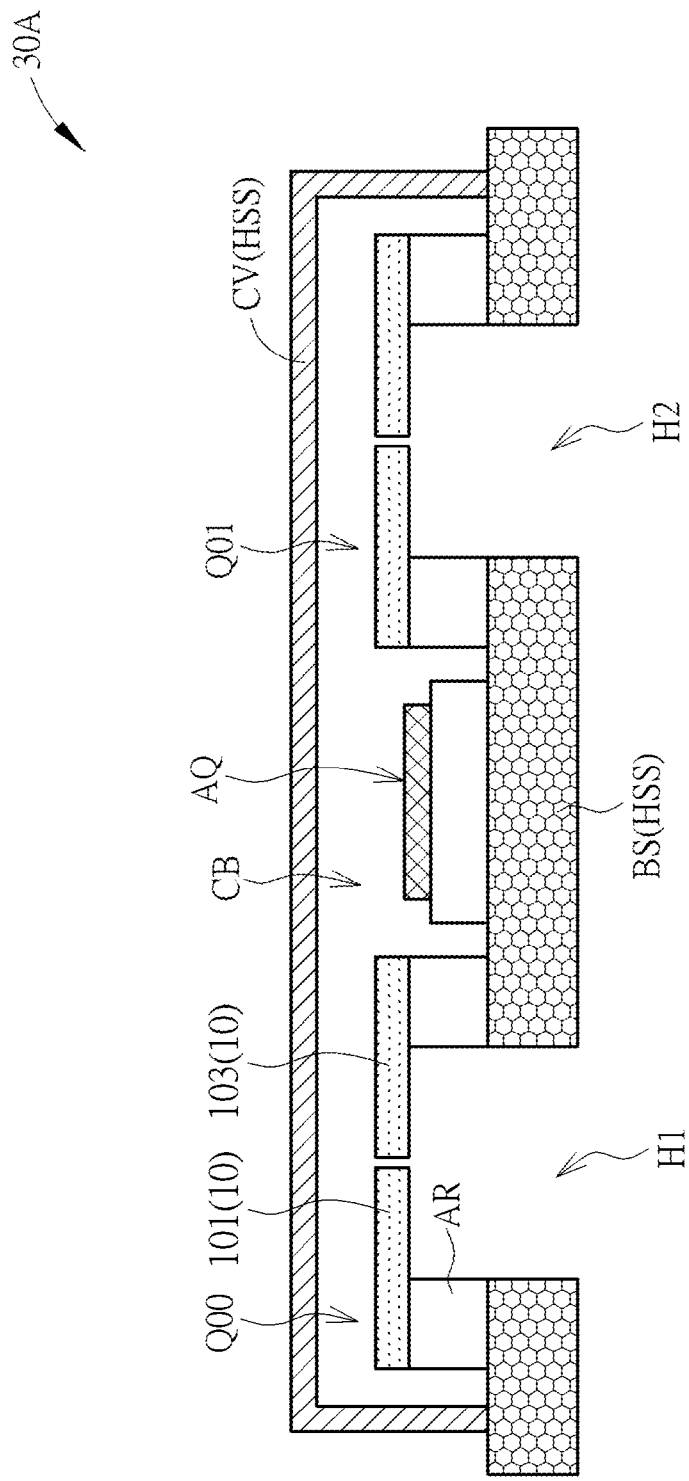
FIG. 9 is a schematic diagram of a cross sectional view illustrating an air quality sensing module according to an embodiment of the present invention.

Furthermore, the air pump of the present invention may be integrated into air quality sensing module in package level, wherein the embodiments of the air quality sensing modules in package level may be shown in FIG. 7 to FIG. 9. Note that the air quality sensing module in package level may be formed by a semiconductor manufacturing process (the semiconductor manufacturing process include a package process).

In FIG. 7, the housing HSS of the air quality sensing module 28A may include a base BS, wherein the air pump Q00 and the air quality sensor AQ may be disposed on the base BS. The base BS may be hard or flexible, wherein the base BS may include glass, plastic, quartz, sapphire, metal, polymer (e.g., polyimide (PI), polyethylene terephthalate (PET)), any other suitable material or a combination thereof. As an example, the base BS may be a circuit board including a laminate (e.g., copper clad laminate, CCL), a land grid array (LGA) board or any other suitable board containing conductive material, but not limited thereto. In FIG. 7, a normal direction of the base BS may be parallel to the direction Z.

In FIG. 7, the housing HSS of the air quality sensing module 28A may include a covering structure CV used to cover and protect the air pump Q00 and the air quality sensor AQ. In FIG. 7, the air pump Q00 and the air quality sensor AQ may be disposed between the base BS and the covering structure CV. For example, the covering structure CV may include glass, plastic, quartz, sapphire, metal, polymer, any other suitable material or a combination thereof. For example, the covering structure CV may be a one-piece structure or may be formed of a plurality of sub-structures (e.g., a plurality of substrates).

In FIG. 7, the base BS may have a hole H1, and the air pump Q00 is corresponding to the hole H1, such that the air pump Q00 may produce the airflow from the ambient toward the chamber CB or from the chamber CB toward the ambient. For example, in FIG. 7, the air pump Q00 produces a first airflow from the ambient toward the chamber CB so that the air quality sensor AQ senses the air quality of the ambient during a first time, and the air pump Q00 produces a second airflow from the chamber CB toward the ambient to refresh the chamber CB during a second time. Note that the pressure of the chamber CB during the first time may be greater than the pressure of the chamber CB during the second time.

Compared with the air quality sensing module 28A shown in FIG. 7, the covering structure CV of the air quality sensing module 29A shown in FIG. 8 may further have another hole H2, such that the airflow produced by the air pump Q00 may flow between two holes H1 and H2, and the chamber CB may be an air channel. Since the direction of the airflow produced by the air pump Q00 of the present invention is reversible, the air pump Q00 may produce the airflow from the ambient toward the chamber CB in a time segment, and the air pump Q00 may produce the airflow from the chamber CB toward the ambient in another time segment, but not limited thereto.

Compared with the air quality sensing module 28A shown in FIG. 7, the air quality sensing module 30A shown in FIG. 9 may include another air pump Q01, and the base BS may further have another hole H2. As an example (FIG. 9), the air pump Q00 may produce a first airflow from the ambient toward the chamber CB and the air pump Q01 may produce a third airflow from the ambient toward the chamber CB during a first time, and the air pump Q00 may produce a second airflow from the chamber CB toward the ambient and the air pump Q01 may produce a fourth airflow from the chamber CB toward the ambient during a second time, such that the pressure of the chamber CB during the first time may be greater than the pressure of the chamber CB during the second time, but not limited thereto.

As another example (FIG. 9), the air pump Q00 may produce the airflow from the ambient toward the chamber CB and the air pump Q01 may produce another airflow from the chamber CB toward the ambient simultaneously, or the air pump Q00 may produce the airflow from the chamber CB toward the ambient and the air pump Q01 may produce another airflow from the ambient toward the chamber CB simultaneously (i.e., the directions of the airflows produced by the air pumps Q00 and Q01 of the present invention are reversible), such that the chamber CB may be an air channel, but not limited thereto.

Figure 10:
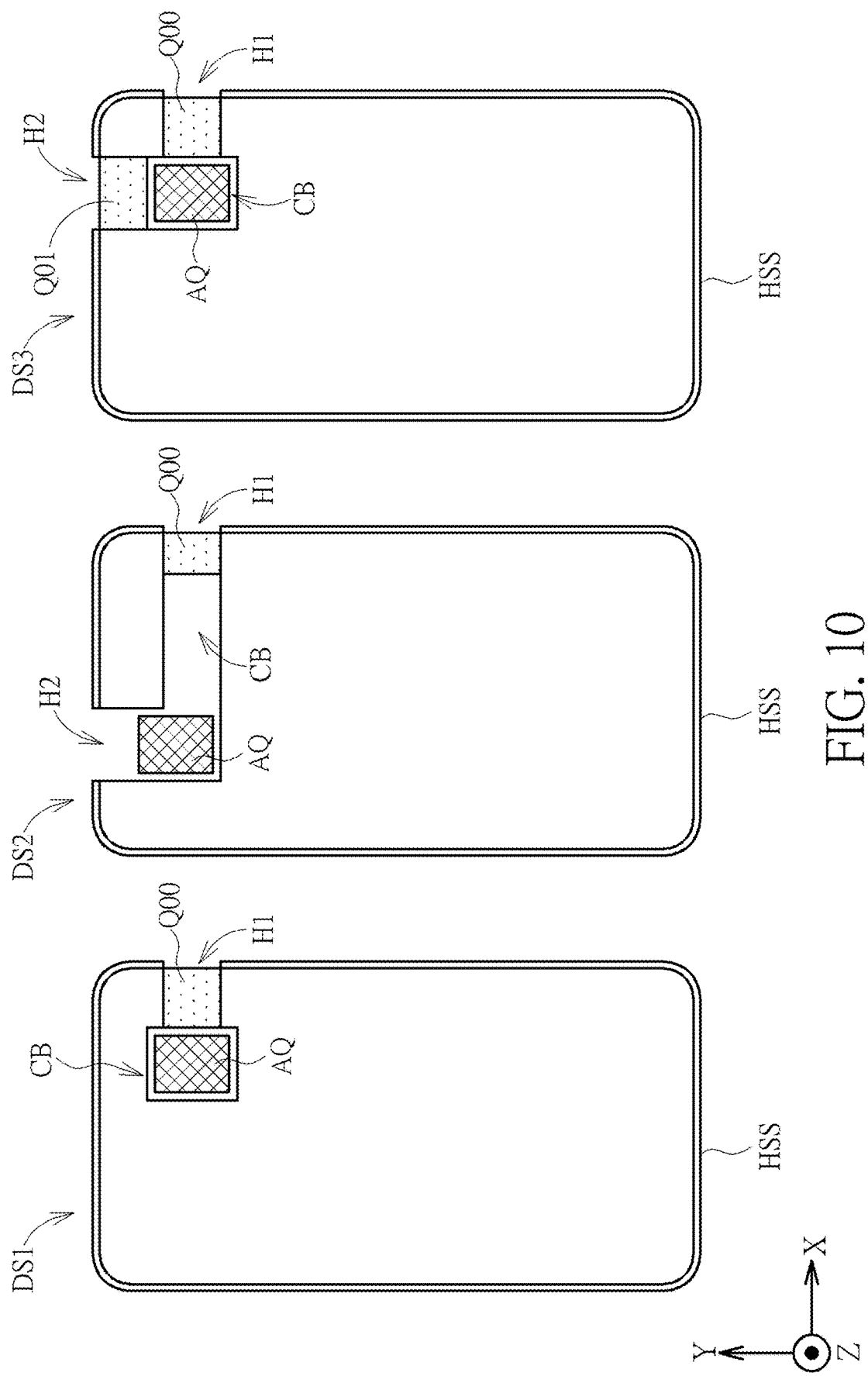
FIG. 10 is a schematic diagram of three designs of the air quality sensing module according to the present invention.

Note that FIG. 10 shows three designs of the air quality sensing module. In the first design DS1, the air pump Q00 can pump the air into the chamber CB through the hole H1 and pump the air out the chamber CB through the hole H1 in different times, wherein the air quality sensing module 26A shown in FIG. 5 and the air quality sensing module 28A shown in FIG. 7 belong to the first design DS1. In the second design DS2, the air pump Q00 can pump the air into the chamber CB through the hole H1 and the air can flow out the chamber CB through the hole H2, or the air pump Q00 can pump the air out the chamber CB through the hole H1 and the air can flow into the chamber CB through the hole H2, wherein the air quality sensing module 29A shown in FIG. 8 belongs to the second design DS2. In the third design DS3, the air pumps Q00 and Q01 can simultaneously pump the air into the chamber CB through the holes H1 and H2 and simultaneously pump the air out the chamber CB through the holes H1 and H2 in different times, or the air pump Q00 can pump the air into the chamber CB through the hole H1 and the air pump Q01 can pump the air out the chamber CB through the hole H2 simultaneously, wherein the air quality sensing module 27A shown in FIG. 6 and the air quality sensing module 30A shown in FIG. 9 belong to the third design DS3.

Figure 11:
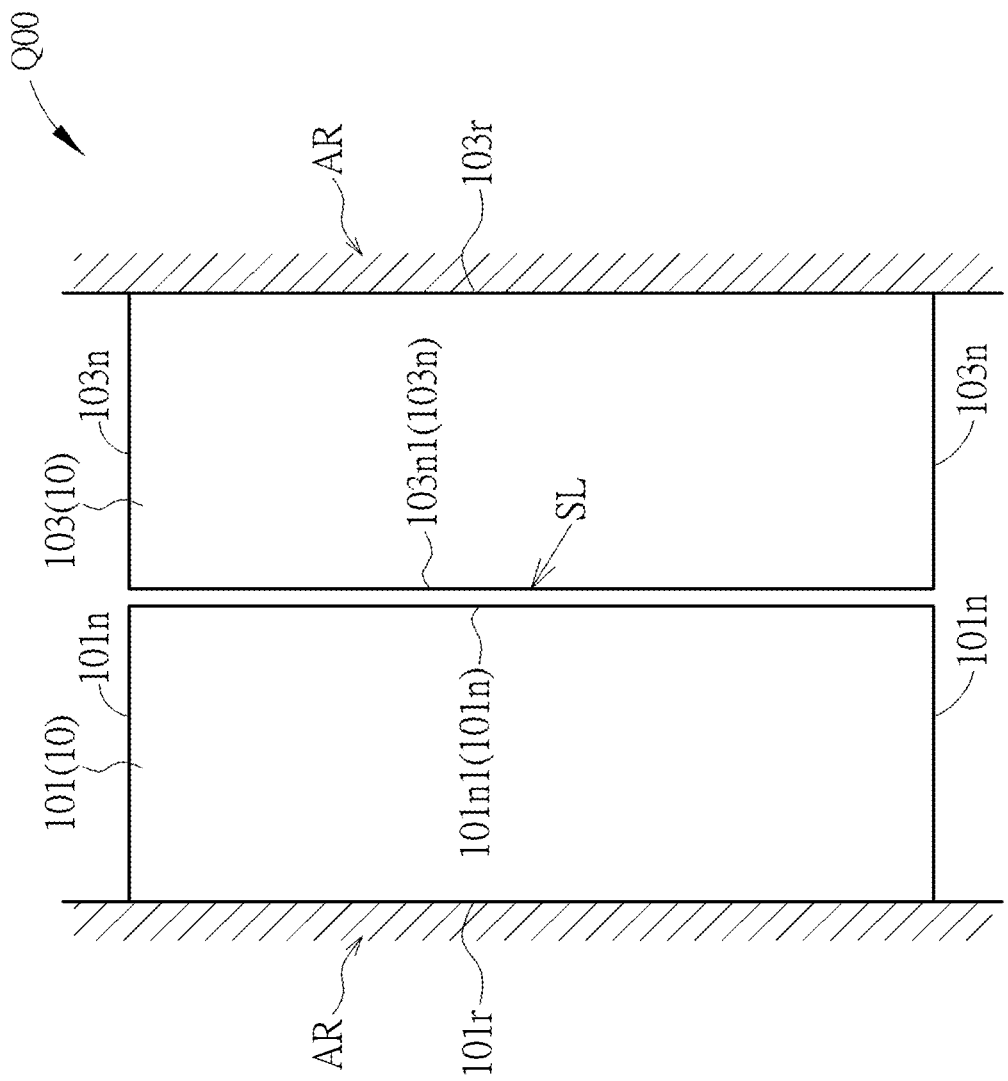
FIG. 11 is a schematic diagram of an air pump according to an embodiment of the present invention.

Referring to FIG. 11, FIG. 11 is a schematic diagram of an air pump according to an embodiment of the present invention. Note that the air pump Q00 shown in FIG. 11 may be an example used in the air quality sensing module, and the air pump Q00 may be a MEMS chip for example. As shown in FIG. 11, two flaps 101 and 103 of the air pump Q00 are opposite to each other in a top view viewing along a top-view direction (i.e., the direction Z), and the actuators AT1 and AT2 are respectively disposed on the flaps 101 and 103. Note that the two flaps 101 and 103 form a flap pair.

In FIG. 11, the flap 101 includes a first anchored edge 101r anchored on the anchor structure AR, and the flap 101 includes first free edges 101n other than the first anchored edge 101r which are non-anchored. Similarly, the flap 103 includes a second anchored edge 103r anchored on the anchor structure AR, and the flap 103 includes second free edges 103n other than the second anchored edge 103r which are non-anchored. Namely, each of the flaps 101 and 103 only has one anchored edge, and other edges are free edges.

In FIG. 11, a slit SL is formed between the flaps 101 and 103, such that the flaps 101 and 103 are divided by the slit SL, and one first free edge 101n1 of the flap 101 and one second free edge 103n1 of the flap 103 are defined by the slit SL (the first free edge 101n1 and the second free edge 103n1 are opposite sidewalls of the slit SL). Note that the vent opening OPV formed between the flaps 101 and 103 is formed because of the slit SL.

A simulation is conducted to validate an efficacy of the air pump or the airflow generating component/chip, where the air pump or the airflow generating component/chip is used to generate airflow toward an enclosed chamber. Simulation results show that the air pressure inside the chamber can be increased to a steady state in less than 0.5 milliseconds (ms). It implies, it should not take too much time for the air quality sensing module to obtain air quality data in terms of measurement results, and thus, in addition to close-proximity air quality sensing, real-time air quality sensing is realizable.

In summary, by applying the small size of air pump or airflow generating chip in the quality sensing module, it is possible to integrate the air quality sensing module into handheld electronic device such as smart phone or smart watch. Therefore, revolutionary real-time and close-proximity air quality sensing is realizable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An air quality sensing module, comprising:
a chamber;
an air quality sensor; and
a first air pump;
wherein the air quality sensing module is disposed within a device;
wherein the first air pump produces an airflow toward or away from the chamber, for the air quality sensor to perform an air quality sensing operation;
wherein a direction of the airflow produced by the first air pump within the device is reversible;
wherein the first air pump is a micro electro mechanical system (MEMS) chip.

2. The air quality sensing module of claim 1,
wherein the first air pump produces a first airflow from an ambient toward the chamber so that the air quality sensor senses an air quality of the ambient during a first time;
wherein the first air pump produces a second airflow from the chamber toward the ambient to refresh the chamber during a second time.

3. The air quality sensing module of claim 1,
wherein the first air pump comprises a film structure, configured to be actuated to generate a plurality of air pulses at an ultrasonic rate;
wherein the plurality of air pulses produces a net airflow toward one single direction.

4. The air quality sensing module of claim 1,
wherein the first air pump comprises a film structure;
wherein the film structure comprises a flap pair, the flap pair comprises a first flap and a second flap disposed opposite to each other;
wherein the flap pair is actuated to perform a movement to form an opening at an opening rate which is synchronous with an ultrasonic rate.

5. The air quality sensing module of claim 1,
wherein the first air pump comprises a film structure;
wherein the film structure is actuated by a driving signal;
wherein the driving signal is generated according to an input signal comprising or being a nonzero direct current (DC) voltage.

6. The air quality sensing module of claim 1,
wherein the first air pump comprises a film structure;
wherein the film structure is actuated by a modulating signal to perform a common mode movement;
wherein the modulating signal is generated according to an input signal comprising or being a nonzero DC voltage.

7. The air quality sensing module of claim 1,
wherein the first air pump comprises a film structure;
wherein the film structure is actuated by a demodulating signal to perform a differential mode movement to form an opening at an opening rate which is synchronous with an ultrasonic pulse rate.

8. The air quality sensing module of claim 1,
wherein the first air pump comprises a film structure;
wherein the film structure is actuated by a modulating signal to perform a common mode movement;
wherein the film structure is actuated by a demodulating signal to perform a differential mode movement to form an opening;
wherein the direction of the airflow produced by the first air pump is controlled according to a phase between the modulation signal and the demodulation signal.

9. The air quality sensing module of claim 1, wherein a strength of the airflow produced by the first air pump within the device is adjustable.

10. The air quality sensing module of claim 9,
wherein the first air pump comprises a film structure;
wherein the film structure is actuated by a modulating signal to perform a common mode movement;
wherein the film structure is actuated by a demodulating signal to perform a differential mode movement to form an opening;
wherein the strength of the airflow is adjusted via adjusting an amplitude of the modulation signal or the demodulation signal, or via adjusting a frequency of the modulation signal or the demodulation signal.

11. The air quality sensing module of claim 1, further comprising a second air pump, wherein the first air pump produces a first airflow from an ambient toward the chamber and the second air pump produces a third airflow from the ambient toward the chamber during a first time, and the first air pump produces a second airflow from the chamber toward the ambient and the second air pump produces a fourth airflow from the chamber toward the ambient during a second time.

12. The air quality sensing module of claim 1, further comprising a second air pump, wherein the first air pump produces the airflow from an ambient toward the chamber and the second air pump produces another airflow from the chamber toward the ambient simultaneously.

13. An air pump, comprising:
a first flap and a second flap, wherein the first flap and the second flap are opposite to each other in a top view viewing along a top-view direction;
a first actuator, disposed on the first flap;
a second actuator, disposed on the second flap; and
an anchor structure;
wherein the first flap comprises a first anchored edge anchored on the anchor structure, and the first flap comprises first free edges other than the first anchored edge which are non-anchored;
wherein the second flap comprises a second anchored edge anchored on the anchor structure, and the second flap comprises second free edges other than the second anchored edge which are non-anchored.

14. The air pump of claim 13,
wherein a slit is formed between the first flap and the second flap;
wherein one of the first free edges of the first flap and one of the second free edges of the second flap are defined by the slit.

15. The air pump of claim 13,
wherein the first flap and the second flap are actuated to perform a differential mode movement to form an opening;
wherein the opening is formed because of a slit.

16. The air pump of claim 13, wherein the first flap and the second flap perform a common mode movement to form an air pressure variation, and the first flap and the second flap perform a differential mode movement to form an opening.

17. The air pump of claim 16, wherein the first flap and the second flap perform the common mode movement to form the air pressure variation with a frequency, and the first flap and the second flap perform the differential mode movement to form the opening at an opening rate synchronous with the frequency.

18. The air pump of claim 13, wherein the first flap and the second flap are actuated to produce a plurality of air pulses, and the air pulses are asymmetric.

19. An air quality sensing module, comprising:
- a chamber;
- an air quality sensor; and
- a first air pump;
- wherein the air quality sensing module is disposed within a device;
- wherein the first air pump produces an airflow toward or away from the chamber, for the air quality sensor to perform an air quality sensing operation;
- wherein a direction of the airflow produced by the first air pump within the device is reversible;
- wherein a strength of the airflow produced by the first air pump within the device is adjustable.

20. The air quality sensing module of claim 19,
- wherein the first air pump comprises a film structure;
- wherein the film structure is actuated by a modulating signal to perform a common mode movement;
- wherein the film structure is actuated by a demodulating signal to perform a differential mode movement to form an opening;
- wherein the strength of the airflow is adjusted via adjusting an amplitude of the modulation signal or the demodulation signal, or via adjusting a frequency of the modulation signal or the demodulation signal.

* * * * *